United States Patent
Colon et al.

(10) Patent No.: US 9,438,500 B2
(45) Date of Patent: Sep. 6, 2016

(54) TRANSACTIONAL INTEGRITY ASSESSMENT

(71) Applicant: Comcast Cable Communications, LLC, Philadelphia, PA (US)

(72) Inventors: Wilfredo Colon, Philadelphia, PA (US); John Olander, Phoenixville, PA (US); Olakunle Ekundare, Sicklerville, NJ (US); Patrick O'Hare, Philadelphia, PA (US); Justin Menard, Yardley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 114 days.

(21) Appl. No.: 14/220,667

(22) Filed: Mar. 20, 2014

(65) Prior Publication Data

US 2015/0271035 A1     Sep. 24, 2015

(51) Int. Cl.
*G06F 15/16* (2006.01)
*H04L 12/26* (2006.01)
*H04L 12/24* (2006.01)

(52) U.S. Cl.
CPC .............. *H04L 43/16* (2013.01); *H04L 41/142* (2013.01); *H04L 41/5009* (2013.01); *H04L 43/08* (2013.01)

(58) Field of Classification Search
CPC ........................... H04L 43/08; H04L 41/5009
See application file for complete search history.

(56) References Cited

U.S. PATENT DOCUMENTS

| | | | | |
|---|---|---|---|---|
| 7,870,252 B2 * | 1/2011 | Keller | .................. | H04L 67/025 709/220 |
| 8,051,218 B2 * | 11/2011 | Ferlitsch | ............ | G03G 15/5075 358/3.22 |
| 8,201,207 B2 * | 6/2012 | An | ...................... | H04L 12/2801 370/225 |
| 8,583,472 B2 * | 11/2013 | Iannucci | .......... | G06Q 10/06393 705/7.39 |
| 8,830,081 B2 * | 9/2014 | Aguirre | .................... | G08B 5/36 340/539.21 |
| 2006/0059034 A1 * | 3/2006 | Iannucci | .......... | G06Q 10/06393 705/7.39 |
| 2008/0247321 A1 * | 10/2008 | Keller | .................. | H04L 67/025 370/241 |
| 2010/0154017 A1 * | 6/2010 | An | ..................... | H04L 12/2801 725/111 |
| 2014/0081887 A1 * | 3/2014 | Iannucci | .......... | G06Q 10/06393 705/347 |
| 2015/0006097 A1 * | 1/2015 | Gao | ....................... | H01L 22/20 702/81 |

* cited by examiner

*Primary Examiner* — Moustafa M Meky
(74) *Attorney, Agent, or Firm* — Banner & Witcoff, Ltd.

(57) ABSTRACT

Systems and methods are disclosed for effectively managing a network of computing devices by collecting and processing performance metric information from a plurality of devices in the network. In one embodiment, a computing device performance monitor may be configured to collect a plurality of performance metric information for one or more monitored computing devices and may assign integrity scores to the plurality of performance metrics. The performance monitor may be configured to determine performance values for the one or more monitored computing devices, and use the performance values to determine an appropriate response or corrective measure.

20 Claims, 4 Drawing Sheets

TRANSACTIONAL INTEGRITY ASSESSMENT

BACKGROUND

To successfully function, communication networks rely on the operation of a plurality of individual devices. Network of thousands of devices requires processing large volumes of data such as large volumes of periodic, offline status report data to identify and respond to problems or failures in the performance of these devices. Such processing may be laborious and inefficient since the performance and health of each individual device in the network may monitored. Thus, there remains an ever-present need for effective approaches to managing data in real-time to maintain a network.

SUMMARY

The following summary is for illustrative purposes only, and is not intended to limit or constrain the detailed description. Users (e.g., customers) of a network may periodically contact or interact with their service provider for various different reasons, among others, use of services, consumption of and interaction with content, troubleshooting or reporting device problems, device replacement, diagnostic repairs, billing questions, and/or other service or network related issues. For each interaction or transaction with a user, the service or network provider may initiate a service with the user. The disclosure is directed, in one aspect, to systems and methods aimed at satisfying the need of effectively managing and maintaining a content distribution network by monitoring, on a transactional basis with the user, the real-time health and performance of individual devices on the network. Some aspects of this disclosure relate to identifying performance metrics for one or more computing devices involved in delivering services to a user. In one aspect, where the performance of the one or more devices may be monitored during a service session with the user. Further aspects of this disclosure relate to determining a performance value for each of the various monitored computing devices, and determining whether an update, maintenance or repair service is required for one or more of those devices.

In an exemplary embodiment, this is achieved by initiating a service session is initiated with a user, and a plurality of performance metrics is identified. During the service session, the performance metrics for the various monitored devices are processed, and a performance value is determined for each monitored device. Thereafter, in view of the overall performance of the monitored device(s), a determination is made as to whether corrective measures (e.g., updates, service repairs) are required for one or more of the monitored devices, and whether to continue the service session with the user.

In another embodiment, a performance monitoring device may be configured to receive performance metric data from the various monitored devices either during normal operation or during a dedicated service session. For each performance metric, a plurality of performance metric ranges may be identified, and a corresponding value (e.g., integrity score) may be determined for each of the performance metric ranges. The performance monitoring device may be configured to assign the integrity score to the monitored computing device in accordance with the performance metric data obtained during a service session with the user, and to combine some or all of the assigned integrity scores to yield an integrity score total for the one or more monitored computing devices. The performance monitoring device may be further configured to determine a performance value for the one or more monitored devices in accordance with the integrity score total for these devices. The performance monitoring device may be configured to use the performance value to report the general health of the monitored computing device(s) and, if needed, indicate whether corrective measures are required.

In some embodiments, various performance metric ranges may correspond to different levels of performance quality for the one or more monitored devices. Various performance metrics may be utilized, and these metrics may vary depending on the type of device being monitored. For example, performance metric data for user premises equipment (e.g., gateways, set-top-boxes, digital video recorders, modems, etc.) may include, among others, upstream data carrier reception level, downstream data carrier reception level, upstream signal-to-noise ratio level, downstream signal-to-noise ratio level, upstream transmit level, and pre-equalization coefficient values.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
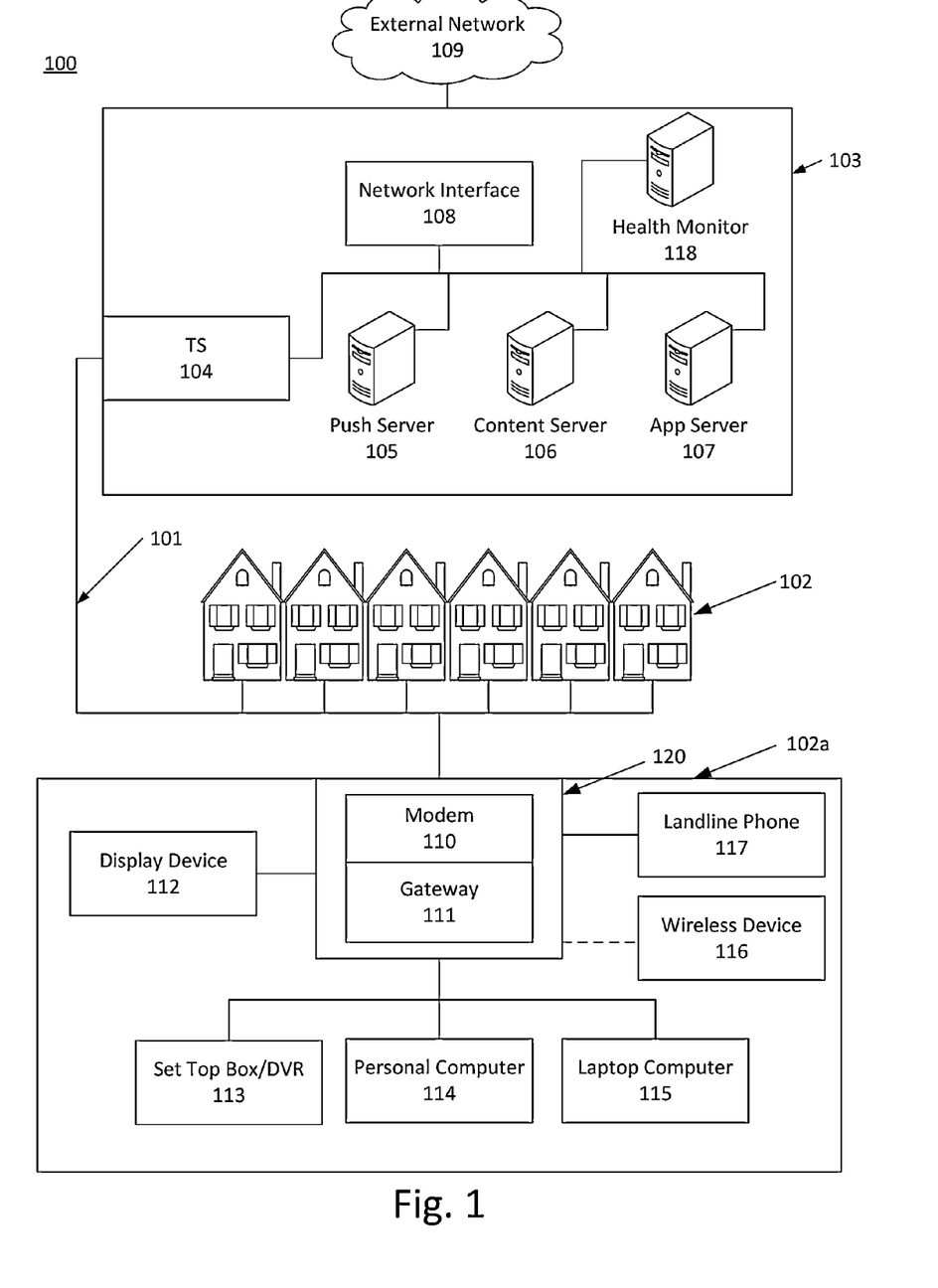
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The various devices in the system may be configured to perform performance monitoring services. For example, the gateway 111 and modem 110 may monitor its own performance metrics (examples described further below) and may report its own performance metrics to a performance monitoring computing device 118 (not shown in FIG. 1). The performance monitoring computing device 118 may collect performance metric information from a variety of devices in the system (e.g., devices at the various premises 102), and may perform evaluations on the various metrics during a service session to develop an assessment of the real-time performance of a particular device or portion of a network.

Figure 2:
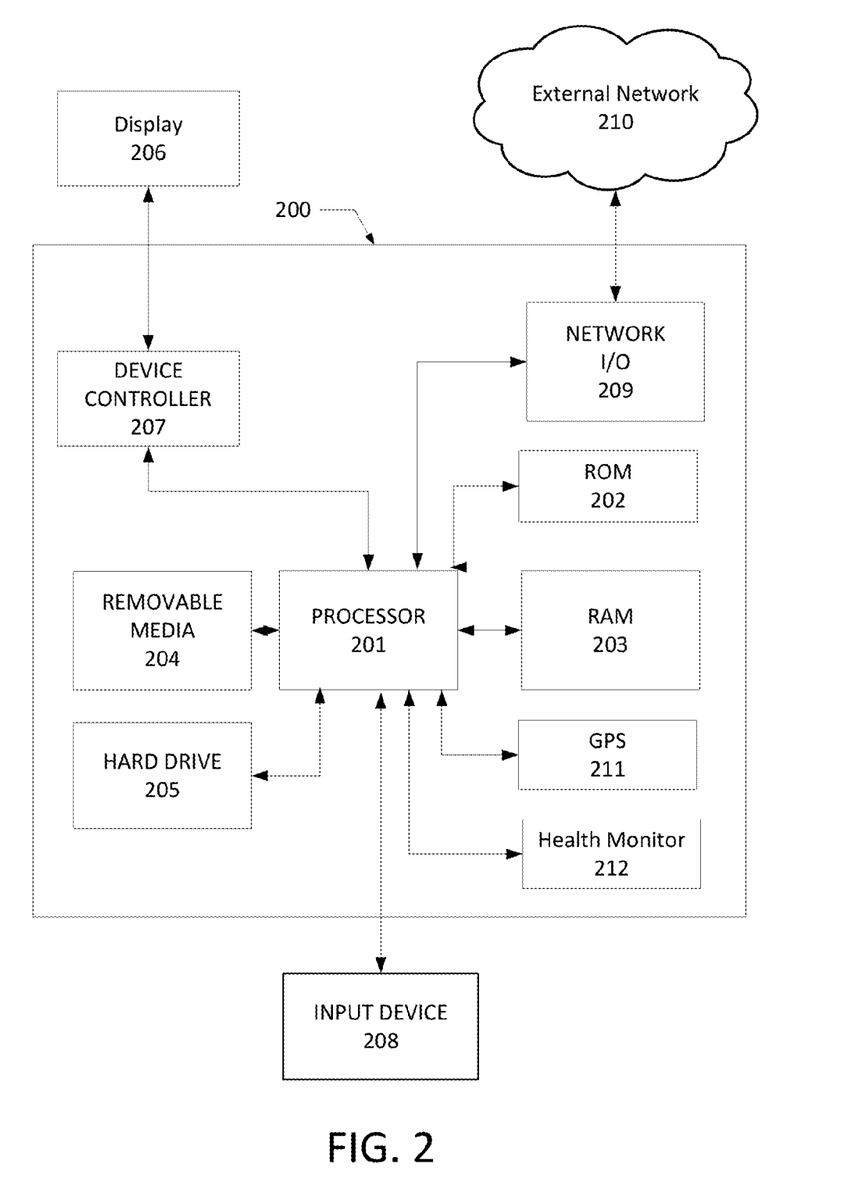
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. FIG. 2 illustrates a performance monitor 212 component, which may be a dedicated processor configured to perform the various performance monitoring functions described herein, or it may be implemented by the device's main processor 201.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
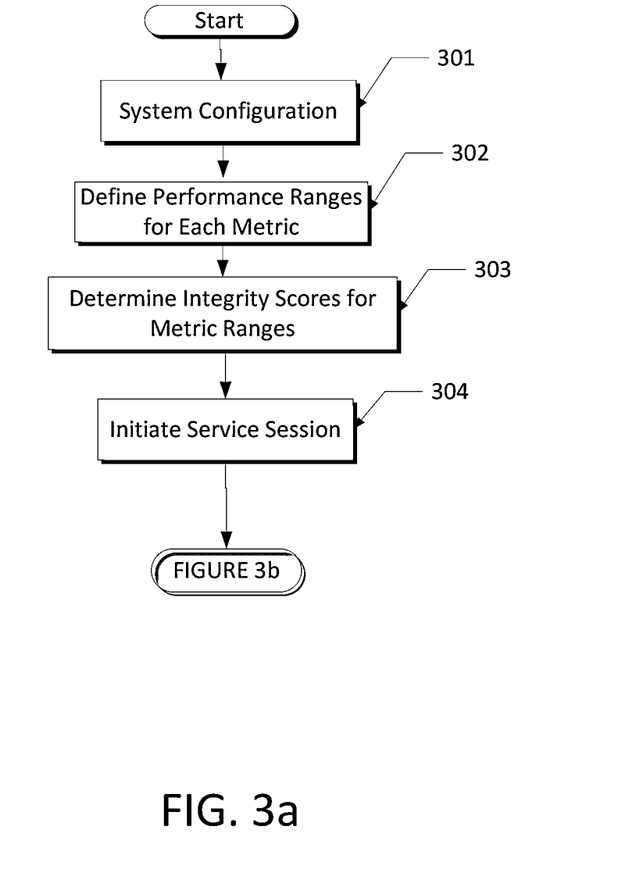
FIGS. 3a and 3b illustrate an exemplary flowchart of a method in accordance with one or more aspects of the present disclosure.
Figure 3B:
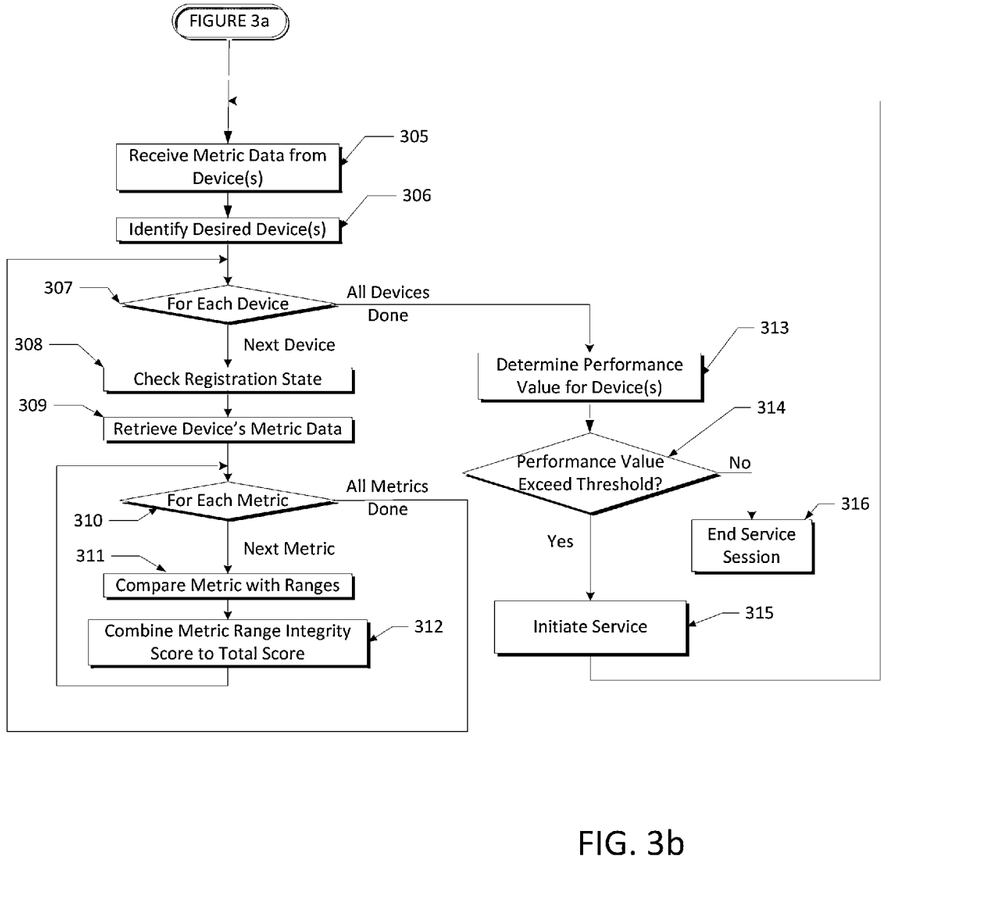

FIGS. 3*a* and 3*b* illustrate an example performance or health monitoring method according to one embodiment that may be performed by one or more computing devices, such as gateway 111, server 107, performance monitor 118 or any other desired computing device. When describing the steps of the method below, the term "system" may be used when referring to each component, either singularly or collective, employed at each step of the method, and can refer to any of the components described above. Such usage is merely for ease in discussing the method, and should not be interpreted as limiting the exact embodiment in which the following method may be performed.

Referring now to FIG. 3*a*, at step 301, an initial system configuration may be performed. During step 301, the system may associate one or more user premises equipment (e.g., modem 110, STB 113, etc.) with one or more users on a network. In one embodiment, one or more computer devices may be configured to request information identifying one or more user premises equipment whose performance may be monitored. For example, the system may request device identifier data, such as a device media access control (MAC) address for the one or more computing devices whose performance may be monitored. In this example, the system may also be configured to request customer identification information, such as a user account number or profile, which identifies the user(s) associated with the one or more computing devices whose performance may be monitored. In some embodiments, the system may be configured to associate device identifier data with user identification information in a database. In other embodiments, the system may be configured to store in memory the device identifier data and user identification information.

During step 301, one or more computing devices may identify the various performance metrics available for the one or more devices whose performance may be monitored. The performance metrics may vary depending on the type of device(s) being monitored. For example, one model of a device may report a first set of performance metrics, while a different model reports different performance metrics, and monitoring device 118 may be configured to process the metrics for the various models differently. The performance metrics may be measured and reported by the devices themselves, either periodically or upon request by monitoring device 118. In some embodiments, the performance metrics may be measured by performance monitor 118 itself (or by any other device in the system).

The configuration at step 301 may include establishing the parameters and conditions by which the performance metrics will be obtained. In some embodiments, various monitored devices may be configured to report performance metrics when a service session has been initiated. In other embodiments, the monitored devices may be configured to report performance metrics upon request for said metrics from one or more computing devices. In one embodiment, the monitored devices may be configured to report some performance metrics according to a predetermined schedule, (e.g., one metric is reported every two minutes, another is reported continuously, etc.), or after a service session has been initiated, and may be configured with the destination address to which they should be sending the performance data. In some embodiments, the configuration may also include programming a computing device, such as monitoring device 118, to collect certain performance metrics (e.g., monitoring device 118 may make certain measurements every minute, and other measurements continuously, etc.). Various reporting details for the different performance metrics are explained in greater detail below.

At step 302, the possible range of values that a performance metric may be divided into a plurality of predefined ranges, corresponding to different levels of device performance. For example, one performance metric may have three ranges corresponding to the level of device performance with respect to the particular performance metric, e.g., good performance, OK or fair performance, and poor performance. In another example, one performance metric may have four ranges corresponding to the level of device performance with respect to the performance metric, e.g., good performance, OK or fair performance, poor performance, and invalid performance. An invalid performance may refer to any metrics that fall outside of the good, fair, and poor performance ranges. As will be described further below, these ranges may be used to determine whether a measured performance metric is indicative of a problem with the one or more devices being monitored during the service session. The performance metrics may be based on a variety of measured characteristics, such as signal dB loss. In some embodiments, the predefined ranges for a performance metric may be based on the type of device being monitored (e.g., a Motorola STB, a Cisco STB and a DOCSIS STB). In some embodiments, the system may perform step 302 during the system configuration step (i.e., step 301).

At step 303, one or more of the predefined ranges of the performance metrics (e.g., the good, fair, poor, and invalid ranges for each performance metric) may be assigned an integrity score. In some embodiments, a performance metric in the Good range may be assigned a score of zero points, a performance metric in the Fair range may be assigned a score of eight points, and a performance metric in the Poor range may be assigned a score of twelve points. In alternative embodiments, the score values may be varied if, for example, one performance metric is determined to be a better (or worse) indicator of a problem with the device than other performance metrics. In some embodiments, the system may perform step 303 during the system configuration step (i.e., step 301).

Examples of the performance metrics that may be used, along with their ranges and integrity scores, are described below. Various performance metrics may refer to values measured and reported by the devices being monitored (e.g., user premises devices, STB/DVR 113, etc.), or by other devices in the local office 103 (or beyond). The various values indicated may refer to measurements taken in real-time during the service session, or over a predetermined period of time, such as a 1-minute period, 5-minute period, etc.

One metric may be a downstream (DS) signal-to-noise ratio (SNR) level. This metric may be measured by a device being monitored during the service session, such as a user premises computing device, and may measure the signal-to-noise ratio quality for a downstream signal received at the device to determine a measured metric value for the performance metric. In some embodiments, one or more computing devices may store in memory the measured metric value associated with the signal-to-noise ratio for a downstream signal received at the user premises computing device. A downstream signal may be one that is transmitted from the local office 103 using a data transmission frequency to user premises equipment, such as modem 110. In the example of a video reception device, such as a set-top-box (STB) or digital video recorder (DVR), the downstream signal carries the video services that a user may view to the user premises device (e.g., STB 113). The user premises device (e.g., STB 113) may measure the signal-to-noise ratio quality of one or more received signals received over communication link 101, and may report this performance metric to the performance monitoring device 118. In another embodiment, performance monitoring device 118 may measure the signal-to-noise ratio quality of one or more received signals received over communication link 101. The metric ranges for this performance metric may be as indicated in Table 1 below (the "invalid," "poor," "fair" and "good" DS SNR quality may be those reported by the various devices themselves):

TABLE 1

| Measured DS SNR | DS SNR Quality | Integrity Score |
| --- | --- | --- |
| 15 dB to <32 dB | Poor | 12 |
| 32 dB to <35 dB | Fair | 2 |
| 35 dB to 50 dB | Good | 0 |
| <15 dB and >50 dB | Invalid | 2 |

Another performance metric may be an upstream (US) signal-to-noise ratio (SNR) level. This metric may be measured by a computing device at local office 103, such as termination system (TS) 104, and may measure the signal-to-noise ratio quality for an upstream signal received at termination system 104 to determine a measured metric value for the performance metric. In some embodiments, one or more computing devices located at local office 103 may store in memory the measured metric value associated with the signal-to-noise ratio for the upstream signal received at the termination system. In other embodiments, performance monitoring device 118 may request, and then subsequently store in memory, the measured metric value associated with the signal-to-noise ratio for the upstream signal received at the termination system. An upstream signal may be one that is transmitted from user premises equipment using a data transmission frequency to local office 103. In the example of a data transmission device, such as modem 110, the upstream signal carries the data services that a user may consume to the cable modem termination system (e.g., CMTS 104). The cable modem termination system (e.g., CMTS 104) at local office 103 may measure the signal-to-noise ratio quality of one or more received signals received over communication link 101, and may report this performance metric to the performance monitoring device 118. The ranges may be as follows:

TABLE 2

| Measured US SNR | US SNR Quality | Integrity Score |
| --- | --- | --- |
| 5 dB to <28 dB | Poor | 12 |
| 28 dB to <31 dB | Fair | 4 |
| 31 dB to 50 dB | Good | 0 |
| <5 dB and >50 dB | Invalid | 4 |

Another performance metric may be an upstream (US) receive power (RX) level. This metric may be measured by one or more computing devices at local office 103, such as termination system (TS) 104, and may measure the amount of upstream signal received at termination system 104 to determine a measured metric value for the performance metric.

TABLE 3

| Measured US RX | US RX Quality | Integrity Score |
| --- | --- | --- |
| <−25 dBmV to <−4 dBmV and >4 dBmV to 20 dBmV | Poor | 21 |
| −4 dBmV to <−2 dBmV and >2 dBmV to 4 dBmV | Fair | 7 |
| −2 dBmV to 2 dBmV | Good | 0 |
| <−25 dBmV and >20 dBmV | Invalid | 7 |

Another performance metric may be a downstream (DS) receive power (RX) level. This metric may be measured by a device being monitored during the service session, such as a user premises computing device, and may measure the receive power level for a downstream signal received at the device to determine a measured metric value for the metric. The ranges may be as follows:

TABLE 4

| Measured DS RX | DS RX Quality | Integrity Score |
| --- | --- | --- |
| <−40 dBmV to <−12 dBmV and >14 dBmV to 50 dBmV | Poor | 8 |
| −12 dBmV to <−8 dBmV and >10 dBmV to 14 dBmV | Fair | 2 |
| −8 dBmV to 10 dBmV | Good | 0 |
| <−40 dBmV and >50 dBmV | Invalid | 2 |

Another metric may be an upstream (US) transmit power (TX) level, which may refer to a transmit strength used by the monitored device to send upstream signals to the local office 103. The ranges may be as follows:

TABLE 5

| Measured US TX | US TX Quality | Integrity Score |
| --- | --- | --- |
| 7 dBmV to <15 dBmV and >53 dBmV to 65 dBmV | Poor | 8 |
| 15 dBmV to <25 dBmV | Fair | 2 |
| 25 dBmV to 53 dBmV | Good | 0 |
| <7 dBmV and <65 dBmV | Invalid | 2 |

Another metric may be a pre-equalization response code (Flux code), which may refer to the leveraging of adaptive pre-equalizer coefficients to identify and locate the source of particular distortions or impairments on an upstream or downstream signal. The Flux code ranges may be as follows:

TABLE 6

| Flux Code | Flux Code Quality | Integrity Score |
| --- | --- | --- |
| 1001, 1002, 3001, 3002 | Poor | 21 |
| 1003, 1004, 3000, Other | Fair | 4 |
| 0000, 1000, 2001, 9999 | Good | 0 |
| Any other value | Invalid | 0 |

Another performance metric may be an Out-of-Band (OOB) signal-to-noise ratio (SNR) level or quality. This metric may be measured by a device being monitored during the service session, such as a user premises computing device, and may measure the signal-to-noise ratio quality for an out-of-band signal received at the device. An out-of-band signal may be one that is transmitted from the local office 103 using a data transmission frequency or band that is different from a frequency or band used to transmit a video signal. In the example of a video reception device, such as a set-top-box (STB) or digital video recorder (DVR), the in-band signals may be the frequencies or digital channels carrying the video services that a user may view, and the out-of-band signals may be the other frequencies or digital channels available in the transmission media (e.g., communication link 101). The user premises device (e.g., STB 113) may measure the signal-to-noise ratio quality of one or more received out-of-band signals received over the link 101, and may report this performance metric to the performance monitoring device 118. In other embodiments, performance monitoring device 118 may measure the signal-to-noise ratio quality of one or more received out-of-band signals received over the link 101.

TABLE 7

| Measured OOB SNR | OOB SNR Quality | Integrity Score |
| --- | --- | --- |
| <18 dB | Poor | 8 |
| 18 dB to <20 dB | Fair | 2 |
| 20+ dB | Good | 0 |

Another metric may be an Inband (IB) SNR level. Similar to the OOB SNR Quality metric discussed above, the IB SNR level may be a measure of the signal-to-noise ratio of an inband signal. The ranges may be as follows:

TABLE 8

| Measured IB SNR | IB SNR Quality | Integrity Score |
| --- | --- | --- |
| <32 dB | Poor | 12 |
| 32 dB to <35 dB | Fair | 4 |
| 35+ dB | Good | 0 |

Another performance metric may be an OOB transmit power (TX) level, which may refer to a transmit strength of an out-of-band signal This metric may measure how strong the out-of-band signal is when it is received at a user premises device. The ranges may be as follows:

TABLE 9

| Measured OOB TX | OOB TX Quality | Integrity Score |
| --- | --- | --- |
| <35 dBmV or >57 dBmV | Poor | 8 |
| 35 dBmV to <36 dBmV and >56 dBmV to 57 dBmV | Fair | 2 |
| 36 dBmV to 56 dBmV | Good | 0 |

Another metric may be based on a power level of a received in-band signal. The metric may be a numeric value reported by the monitored device, and the range for this IB receive power (RX) level metric may be as follows:

TABLE 10

| Measured IB RX | IB RX Quality | Integrity Score |
|---|---|---|
| <−13 dBmV or >14 dBmV | Poor | 21 |
| −13 dBmV to <−8 dBmV and <10 dBmV to 14 dBmV | Fair | 7 |
| −8 dBmV to 10 dBmV | Good | 0 |

Another metric may be an Inband (IB) AGC metric that tracks the level of automatic gain control being used by the monitored device to output signals received from the local office 103 to local devices (e.g., a television). The metric may be reported as a numerical value by the monitored device, and the range for this metric may be as follows:

TABLE 11

| Measured IB AGC | IB AGC Quality | Integrity Score |
|---|---|---|
| 0 dBmV to <38 dBmV and >79 dBmV to 99 dBmV | Poor | 12 |
| 38 dBmV to <40 dBmV and >75 dBmV to 79 dBmV | Fair | 4 |
| 40 dBmV to 75 dBmV | Good | 0 |
| <0 mV and >99 mV | Invalid | 0 |

Similar to the IB AGC metric discussed above, the Out-of-band (OOB) AGC metric may be a measure of the automatic gain control of an out-of-band signal. In some embodiments this performance metric may depend on the type of device (e.g., Motorola STB) and the model of device (e.g., DCT700, DCT1800, DCT2500, etc.) being monitored. The metric ranges for the various models of Motorola STB may be as follows:

TABLE 12

| | OOB AGC Quality | Integrity Score |
|---|---|---|
| Measured OOB AGC (DTC700) | | |
| 0 mV to <61 mV and >94 mV to 99 mV | Poor | 8 |
| 61 mV to <64 mV and >91 mV to 94 mV | Fair | 2 |
| 64 mV to 91 mV | Good | 0 |
| <0 mV and >99 mV | Invalid | 0 |
| Measured OOB AGC (DTC1800) | | |
| 0 mV to 54 mV and <81 mV to 99 mV | Poor | 8 |
| 54 mV to <56 mV and >77 mV to 81 mV; | Fair | 2 |
| 56 mV to 77 mV | Good | 0 |
| <0 mV and >99 mV | Invalid | 0 |
| Measured OOB AGC (DTC2500) | | |
| 0 mV to <44 mV and >83 mV to 99 mV | Poor | 8 |
| 44 mV to <49 mV and >80 mV to 83 mV | Fair | 2 |
| 49 mV to 80 mV | Good | 0 |
| <0 mV and >99 mV | Invalid | 0 |

TABLE 12-continued

| | OOB AGC Quality | Integrity Score |
|---|---|---|
| Measured OOB AGC (Other) | | |
| 0 mV to <9 mV and >34 mV to 99 mV | Poor | 8 |
| 9 mV to <12 mV and >27 mV to 34 mV | Fair | 2 |
| 12 mV to 27 mV | Good | 0 |
| <0 mV and >99 mV | Invalid | 0 |

The performance metrics discussed above serve only as examples of the various performance metrics that may be obtained and analyzed by the system. One of ordinary skill in the art will appreciate that there are a variety of other performance metrics that can be obtained in relation to user premises equipment (e.g., gateways, set-top-boxes, digital video recorders, modems, etc.), such as forward data channel (FDC) reception level, reverse data channel (RDC) reception level, quadrature amplitude modulation (QAM) receive level, FDC SNR, QAM SNR, and various other suitable performance metrics. Any number of these performance metrics may be referenced or employed herein without departing from the present disclosure. In some embodiments, if a null value is received (e.g., metric data does not exist) for a performance metric, an integrity score of 0 may be assigned for that performance metric.

Furthermore, some of the metric parameters above have been discussed in context of supporting at least one or more different types of computing devices, which may be user premises devices (e.g., a Motorola STB, a Cisco STB, and a DOCSIS STB). The local office 103 may also have corresponding computing devices (e.g. a content server 106) that may serve as a node for communicating with various devices at multiple premises 102, and those nodes may also have performance metric data. There may be, however, different sets of performance metric ranges for the different types of devices. For example, the first type of device discussed above, e.g., the Motorola STB, may have OOB SNR, IB SNR, and OOB TX metrics that vary from that of second type of device, e.g., the Cisco STB, or a third type of device. The ranges for the OOB SNR, IB SNR, OOB TX metrics for the Motorola STB may be as follows:

TABLE 13

| Measured OOB SNR | OOB SNR Quality | Integrity Score |
|---|---|---|
| 1 dB to <18 dB | Poor | 8 |
| 18 dB to <20 dB | Fair | 2 |
| 20 dB to 60 dB | Good | 0 |
| <1 dB and >60 dB | Invalid | 0 |

| Measured IB SNR | IB SNR Quality | Integrity Score |
|---|---|---|
| 1 dB to <32 dB | Poor | 12 |
| 32 dB to <35 dB | Fair | 4 |
| 35 dB to 80 dB | Good | 0 |
| <1 dB and >80 dB | Invalid | 0 |

| Measured OOB TX | OOB TX Quality | Integrity Score |
|---|---|---|
| 0 dB to <35 dB and >57 dB to 80 dB | Poor | 8 |
| 35 dB to <36 dB and >56 dB to 57 dB | Fair | 2 |
| 36 dB to 56 dB | Good | 0 |
| <0 dB and >80 dB | Invalid | 0 |

Different metric ranges may be used for the second type of device discussed above. As an example, for the Cisco STB, the OOB SNR and IB SNR metric ranges may be as follows:

TABLE 14

| Measured OOB SNR | OOB SNR Quality | Integrity Score |
|---|---|---|
| 1 dB to <21 dB | Poor | 8 |
| 21 dB to <25 dB | Fair | 2 |
| 25 dB to 60 dB | Good | 0 |
| <1 dB and >60 dB | Invalid | 0 |
| Measured IB SNR | IB SNR Quality | Integrity Score |
| 1 dB to <32 dB | Poor | 12 |
| 32 dB to <35 dB | Fair | 4 |
| 35 dB to 80 dB | Good | 0 |
| <1 dB and >80 dB | Invalid | 0 |

Continuing with this example, a third device type may have metric ranges for OOB SNR as follows:

TABLE 15

| Measured OOB SNR | OOB SNR Quality | Integrity Score |
|---|---|---|
| >19 dB | Poor | 8 |
| 19 dB to <22 dB | Fair | 2 |
| 22+ dB | Good | 0 |

At step 304, the system may initiate a service session with a user (e.g., customer). In one embodiment, one or more computing devices, such as performance monitor 118, may initiate a service session with the user. In some embodiments, monitoring device 118 may initiate a service session subsequent to a user's attempt to contact or interact with the network provider (e.g., a user contact attempt). There are a variety of ways in which a user may attempt to contact or interact with a content or network provider, such as by visiting the provider's website, calling a service agent or other administrator affiliated with the provider, scheduling an appointment with an in-premise technician (e.g., network provider personnel), and various other suitable methods of establishing contact. Any number of these instances of user-provider interactions may be referenced or employed herein to initiate the service session without departing from the present disclosure.

In some embodiments, one or more computing devices may generate, and subsequently store in memory, data relating to a user's attempt to contact the content or network provider. In some embodiments, one or more computing devices may request user input identifying the reason for and/or the manner in which the user attempted to contact the content or network provider. For example, the user may be presented with a predetermined list of options to select from and/or question to answer (e.g., a questionnaire). As another example, the user may provide a brief description of the reason for and/or manner in which he or she attempted to contact the content or network provider. Users may attempt to contact or establish some form of interaction with their network or content provider for a multitude of reasons (e.g., device failure, degradation of service, questions regarding billing, modifications to current service, etc.).

Every instance of a user-provider interaction provides an opportunity for the system to initiate a service session with that user, notwithstanding the user's initial motivation for establishing contact, and may entail a service session that investigates aspects of the user's service that are different from a reason for the user's contact attempt. For example, if a user calls a service center agent concerning billing questions, monitoring device 118 may be configured to automatically initiate a service session with the user to gauge the overall health and performance of the various computing devices associated with that particular user on the network (e.g., user premises equipment). In this example, monitoring device 118 may request user input identifying the specific billing questions that the user may have, or the number of times the user has previous attempted to contact the provider regarding this issue. In one embodiment, one or more computing devices may be configured to track the number times a user has attempted to contact the service or network provider. In one of these embodiments, one or more computing devices may track the number of times a user attempts to contact the service or network provider concerning a particular issue (e.g., billing question, device repair, etc.).

In another example, if a user has scheduled maintenance for one or more computing devices, a technician may request one or more computing devices, such as monitoring device 118, to initiate a service session. In this example, monitoring device 118 may request input data identifying the one or more user premises equipment requiring maintenance. In still another example, monitoring device 118 may be configured to initiate a service session when the user visits one or more webpages on the network provider's website. In another embodiment, monitoring device 118 may be configured to initiate a service session with a user, notwithstanding a user's previous attempt to contact or interact with the network provider. For example, monitoring device 118 may be configured to periodically initiate a service session. In this example, monitoring device 118 may be configured to initiate an annual, monthly, or weekly service session. In another example, monitoring device 118 may be configured to automatically initiate a service session when a user begins utilizing the network (e.g., consuming content on a display device or consuming content over the Internet).

In some embodiments, one or more computing devices, such as performance monitor 118, may request data relating to a user's attempt to contact the network or service provider. Various types of information relating to the user's contact attempt may be requested. For example, one or more computing devices may request data identifying the user that is attempting to contact the network or service provider (e.g., a user account number, name, address, demographic information, etc.). As another example, one or more computing devices may request data identifying one or more reasons (e.g., complaints, questions, etc.) why the user has attempted to contact the network or service provider. In some embodiments, one or more computing devices may receive input from a user identifying one or more reasons why the user has attempted to contact the network or service provider. For example, the user may be prompted to fill out a questionnaire concerning the motivation and/or basis for contacting the network or service provider.

In some embodiments, one or more computing devices, such as performance monitor 118 may request data identifying the one or more computing devices (e.g., user premises equipment) associated with a user's contact attempt. For example, if a user calls a service center agent concerning general billing questions, performance monitor 118 may associate all equipment (e.g., modem, STB, etc.) at premises 102 with the user's contact attempt. As another example, if a user calls a service center agent concerning a service issue, such as modem 110 receiving a degraded signal, performance monitor 118 may associate modem 110 and any other user premises equipment relating to the generation, transmission, and receipt of the signal(s) at issue with the user's contact attempt.

Performance monitoring device 118 may be configured to transmit data relating to the user's contact attempt to one or more computing devices (e.g., display device) associated with an administrator (e.g., service agent, personnel, technician, etc.). For example, monitoring device 118 may transmit to a display device associated with the administrator information relating to the user's account with the network provider. In another embodiment, during step 304, one or more computing devices, such as monitoring device 118, may request information identifying the user for whom the service session is being initiated (e.g., a user account number, name, address, etc.). In still another embodiment, during step 304, one or more computing devices, such as monitoring device 118, may receive input information from an administrator identifying the user for whom the service session has been initiated.

Referring now to FIG. 3b, after a service session has been initiated, the method may proceed to step 305 where one or more computing devices, such as performance monitoring device 118, may begin to receive metric data from the various monitored devices. The reception of the various metrics may occur through a variety of mechanisms. In some embodiments, the monitored devices themselves (e.g., the user premises devices, STB/DVR 113, gateway 111, etc.) may measure (e.g., track) some of the performance metrics themselves, and may upon request from the performance monitoring device 118 (or periodically) transmit their respective performance metric data to one or more other computing devices, such as performance monitoring device 118. In one of these embodiments, the monitored devices may transmit a message to performance monitoring device 118 containing their respective performance metric data and identifications of the device(s) whose performance data is being sent. In yet another embodiment, the monitored devices may transmit their respective performance metric data and identifier information upon the request of a service agent. The service agent may be located at local office 103, or at premises 102. In other embodiments, the performance metrics may be gathered by the performance monitoring device 118 by polling other devices, or by directly measuring performance. This performance metric data may be stored in a memory, such as hard drive 205, by the performance monitoring device 118.

At step 306, the system may determine which devices (e.g., user premises equipment) are to be analyzed for performance. In one embodiment, one or more computing devices, such as performance monitoring device 118, may determine that each monitored device located at user premises 102 will be analyzed for performance. In some embodiments, performance monitoring device 118 may identify one or more monitored devices (e.g., user premises equipment) to be analyzed based on data obtained during step 304 relating to a user's contact attempt (e.g., questionnaire responses). For example, if a service issue is identified by the user on a questionnaire and/or during the service session, such as STB 113 receiving a degraded signal, all monitored devices associated with or relating to the generation, transmission, and receipt, of the degrade signal may be analyzed. In this example, the list of devices associated with or relating to the generation, transmission, and receipt, of the degrade signal may be dynamically generated by a computing device or retrieved from memory. In some embodiments, the list of devices to be analyzed may be transmitted to a display device associated to the user and/or an administrator (e.g., service agent) during the service session.

In some embodiments, performance monitoring device 118 may determine which devices (e.g., user premises equipment) are to be analyzed for performance notwithstanding the basis for the user's contact attempt. For example, in one of these embodiments, all devices at premises 102 may be analyzed for performance. As another example, one or more devices (e.g., user premises equipment) not associated with data relating to a user's contact attempt may be analyzed for performance. For instance, although a user may contact a provider concerning a complaint an issue with user's video service, performance monitoring device 118 may identify one or more devices to be analyzed that are not associated with the user's contact attempt (e.g., devices relating to the user's telephone and/or home security services). Similarly, although a user may identify (e.g., via a questionnaire response) one or more issues concerning display device 112, performance monitoring device 118 may identify one or more devices to be monitored that are unrelated to the user's contact attempt, such as, in this example, modem 110. In some embodiments, performance monitoring device 118 may determine which devices are to be analyzed for performance in accordance with a request by an administrator (e.g., a service agent may send a command requesting a check of one or more devices identified in the command request). Such a request may include one or more devices unrelated to the basis and/or purpose of the user's contact attempt.

At step 307, the system may begin a loop that is performed for each of the monitored devices identified at step 306. In one embodiment, one or more computing devices monitoring the user premises equipment, such as performance monitor 118, may be begin a loop that is performed for each of the monitored devices identified at step 306. At step 308, for each monitored device analyzed within the loop, the system may check the registration state of that device. In one embodiment, performance monitor 118 may request information relating to the registration state of each monitored device analyzed within the loop. For example, if the registration state of a device is reported as "online," then performance monitor 118 may include the performance metric data for the monitored device in the plurality of metric data to be analyzed when determining the performance value for the one or more monitored devices analyzed during step 307. If the registration state of a device is not reported as "online" then performance monitor 118 may exclude the performance metric data for the monitored device from the plurality of metric data to be analyzed when determining the performance value for the one or more monitored devices analyzed during step 307. During step 308, performance monitoring device 118 may reset the combined integrity score for the monitored device to zero. The integrity score total, as will be discussed below, may be used to keep a running total of various integrity scores based on the device's performance metric data discussed above. In some embodiments, the system may be configured to not perform step 308. In one of these embodiments, the system may include the performance metric data for each monitored device analyzed at step 307 in the plurality of metric data that is analyzed when determining the performance value. In another of these embodiments, the system may request and process a registration state metric retrieved for one or more monitored devices, as discussed further below.

At step 309, the system may retrieve the measured performance metric data for the device being analyzed. In one embodiment, performance monitor 118 may retrieve the measured performance metric data for the device(s) being analyzed at step 307. As noted above, this performance metric data may be measured (e.g., tracked) by the monitored devices themselves, or by one or more computing devices such as performance monitor 118. In one embodiment, during step 309 the retrieved performance metric data may be transmitted to one or more computing devices associated with the service agent conducting the service session. In another embodiment, the retrieved performance metric data may be transmitted to a computing device (e.g., cell-phone, laptop, etc.) associated with the user. In some embodiments, during step 309 one or more computing devices, such as performance monitoring device 118, may store in memory the retrieved performance metric data for the device being analyzed at step 307. In other embodiments, the system may be configured to perform step 309 before performing step 308, or as discussed above, the system may be configured to not perform step 308. In such embodiments, the system may retrieve the measured performance metric data for the device being analyzed, including a registration state metric, and then check the registration state of the device using the registration state metric. In one of these embodiments, information relating to the registration state of the device may be contained within the registration state metric, which is retrieved simultaneously with the performance metric data for the monitored device(s). In another of these embodiments, the system may include the performance metric data for each monitored device analyzed at step 307 in the plurality of metric data that is analyzed when determining the performance value.

At step 310, the system may begin a loop for each performance metric for the monitored device that is being analyzed. In some embodiments, one or more computing devices, such as performance monitoring device 118, may begin a loop for each performance metric identified for the monitored device that is being analyzed at step 307. As noted above, the one or more performance metrics for a monitored device may be identified during step 301.

At step 311, the system may compare the monitored device's measured performance metric values with one or more corresponding ranges of the performance metric to identify a corresponding integrity score. In some embodiments, one or more computing devices, such as performance monitor 118, may compare the monitored device's measured performance metric values with one or more corresponding ranges of the performance metric to identify a corresponding integrity score. During step 311, performance monitoring device 118 may assign the identified integrity score to the monitored device for one or more measured performance metrics. In some embodiments, performance monitoring device 118 may be configured to store in memory the integrity score for the monitored device being analyzed at step 307. In other embodiments, during step 311, performance monitoring device 118 may be configured to retrieve performance metric data from the monitored device being analyzed at step 307. In another embodiment, during step 311, performance monitoring device 118 may be configured to request performance metric data from the monitored device being analyzed at step 307. In still another embodiment, during step 311, the monitored device being analyzed at step 307 may transmit performance metric data to one or more computing devices, such as performance monitoring device 118.

For example, referring to Table 1 above, performance monitoring device 118 may compare a monitored device's (e.g., STB 113) downstream signal-to-noise ratio level (DS SNR) with one or more corresponding ranges identified in Table 1 to assign an integrity score to STB 113. In this example, if the measured signal downstream signal-to-noise ratio for STB 113 is less than 32 dB, performance monitoring device 118 would assign STB 113 an integrity score of 12 for the DS SNR metric; if the measured signal downstream signal-to-noise ratio for the STB 113 is 32 dB to less than 35 dB (e.g., 34 dB), performance monitoring device 118 would assign STB 113 an integrity score of 2 for the DS SNR metric; and if the measured signal downstream signal-to-noise ratio for the STB 113 is 35 dB or more, performance monitoring device 118 would assign STB 113 an integrity score of 0 for the DS SNR metric.

In another example, referring to Table 4, performance monitoring device 118 may compare STB's 113 downstream receive power level (DS RX) with one or more corresponding ranges identified in Table 4 to assign an integrity score to the STB 113. In this example, if the measured downstream receive power level for STB 113 is less than −12 dBmV or greater than 14 dBmV, performance monitoring device 118 would assign STB 113 an integrity score of 8 for the DS RX metric; if the measured downstream receive power level for the STB 113 is −12 dBmV to less than −8 dBMV (e.g., −9 dBmV), performance monitoring device 118 would assign STB 113 an integrity score of 2 for the DS RX metric; and if the measured downstream receive power level for the STB 113 is −8 dBmV to 10 dBMV, performance monitoring device 118 would assign STB 113 an integrity score of 0 for the DS RX metric.

After comparing the monitored device's measured performance metric value with one or more corresponding ranges of the performance metric to identify the corresponding integrity scores for the monitored device, the system may continue to step 312, where the system may combine (e.g., add) one or more assigned integrity scores to the integrity score total for the monitored device being analyzed. In some embodiments, one or more computing devices, such as performance monitoring device 118, may combine one or more assigned integrity scores to the integrity score total for the monitored device being analyzed at step 307. In one of these embodiments, performance monitoring device 118 may be configured to add each integrity score assigned during step 311 to the integrity score total for the monitored device being analyzed at step 307. In still another of these embodiments, performance monitoring device 118 may be configured to add one or more integrity scores identified during step 311 to the integrity score total for the monitored device being analyzed at step 307.

For example, referring to Table 16 above, five (5) performance metrics have been identified for the monitored device in this example (e.g., STB 113). Additionally, corresponding integrity scores have been assigned to STB 113 based on the measured values for each of the identified performance metrics. In particular, the integrity scores for STB 113 in this example were assigned based on a comparison of the measured metric values to the corresponding metric ranges identified in Tables 1-5 above. In this example, performance monitoring device 118 added various integrity scores assigned to determine the integrity score total for STB 113.

TABLE 16

| Performance Metric | Measured Metric Value | Integrity Score |
|---|---|---|
| US SNR | 33 | 0 |
| US RX | 3 | 7 |
| US TX | 55 | 8 |

TABLE 16-continued

| Performance Metric | Measured Metric Value | Integrity Score |
|---|---|---|
| DS RX | 5 | 0 |
| DS SNR | 33 | 2 |
| Device Integrity Score Total | | 17 |

However, addition is just one example of how various integrity scores may be combined to result in a combined integrity score (e.g., integrity score total) for the monitored device being analyzed. In other embodiments, various individual integrity scores may be combined in other ways, such as through multiplication by weighting, to yield the combined integrity score for the device that is being monitored. The system may return to step 310 to continue the loop until all of the analyzed device's performance metrics have been processed, and when all of those metrics have been processed, the system may proceed to step 313.

At step 313, the system may determine a performance value for the one or more monitored devices analyzed during step 307. In some embodiments, one or more computing devices, such as performance monitoring device 118, may determine a performance value for the one or more monitored devices analyzed at step 307. Performance monitoring device 118 may determine the performance value for one or more monitored devices analyzed at step 307 based on the integrity score totals for those devices. In some embodiments, the performance value may be determined by calculating the mean of the integrity score totals for the one or more monitored devices analyzed at step 307. In one of these embodiments, the performance value may be equal to the combined integrity score total determined at step 312. For example, where only one monitored device is analyzed at step 307, the performance value may be equal to the combined integrity score total for that monitored device. In another of these embodiments, performance monitoring device 118 may be configured to calculate the mean of the integrity score totals for the one or more of the monitored devices analyzed at step 307 to determine the performance value.

In other embodiments, one or more computing devices, such as performance monitoring device 118, may store in memory the performance value determined at step 313. In one embodiment, performance monitoring device 118 may transmit to one or more computing devices information relating the determined performance value. In some embodiments, one or more computing devices may store in memory information relating to the performance value determined for one or more user premises devices analyzed at step 307. In another embodiment, one or more computing devices, such as monitoring device 118, may associate the performance value of one or more user premises devices analyzed at step 307 with corresponding device identifier information. Such device identifier information may include a device serial number, a device model number, a device media access control (MAC) address and/or any other suitable alphanumeric identifier that uniquely identifies each user premises device.

TABLE 17

| | US SNR Score | US RX Score | US TX Score | DS RX Score | DS SNR Score | Total Score |
|---|---|---|---|---|---|---|
| Device 1 | 0 | 7 | 0 | 3 | 0 | 10 |
| Device 2 | 0 | 8 | 0 | 4 | 2 | 14 |

TABLE 17-continued

| | US SNR Score | US RX Score | US TX Score | DS RX Score | DS SNR Score | Total Score |
|---|---|---|---|---|---|---|
| Device 3 | 4 | 0 | 1 | 0 | 0 | 5 |
| Device 4 | 12 | 7 | 8 | 0 | 0 | 27 |
| Performance Value (mean) | 4 | 5.5 | 2.25 | 1.75 | .5 | 14 |

Referring to Table 17 above, in this example, five (5) performance metrics have been identified for the four (4) identified devices to be analyzed by performance monitoring device 118. As illustrated in Table 17, Devices 1-4 each have been assigned integrity scores for the five (5) performance metrics based on the measured metric values for that device, and integrity score totals have been determined for each of the monitored devices. In this example, performance monitoring device 118 determined the performance value for the four monitored devices by calculating the mean of the integrity score totals for Devices 1-4.

In some embodiments, one or more computing devices, such as performance monitoring device 118, may store in memory a component performance value for each performance metric that comprises the overall performance value. For example, as illustrated in Table 17 above, the performance monitoring device may store in memory the mean of the integrity scores for Devices 1-4 relating to a particular performance metric (e.g., the component performance value). In this example, the component performance score for Devices 1-4 relating to the US SNR performance metric is 4; the component performance score for Devices 1-4 relating to the US RX performance metric is 5.5, and the component performance score for Devices 1-4 relating to the US TX performance metric is 2.25.

However, calculating the mean of the of the integrity score totals for the one or more monitored devices is just one example of how the performance value may be determined. In other embodiments, the integrity score totals for one or more monitored devices may be combined in other ways, such as through multiplication by weighting, to yield the performance value for the devices that are analyzed at step 307. In some embodiments, the performance value may be determined by incorporating device-specific weighting to calculate the mean of the integrity score totals for the one or more monitored devices.

Table 18 below, illustrates an example of calculating the performance value using device-specific weighting. In this example, as compared to the example in Table 17, Device 1 and 2 have been assigned a weight of 2, thus the integrity scores associated with each performance metric for Devices 1 and 2 have doubled. Consequently, the calculated performance value for Devices 1-4 in this example is now 20.

TABLE 18

| | US SNR Score | US RX Score | US TX Score | DS RX Score | DS SNR Score | Total Score |
|---|---|---|---|---|---|---|
| Device 1 | 0 | 14 | 0 | 6 | 0 | 20 |
| Device 2 | 0 | 16 | 0 | 8 | 4 | 28 |
| Device 3 | 4 | 0 | 1 | 0 | 0 | 5 |
| Device 4 | 12 | 7 | 8 | 0 | 0 | 27 |
| Performance Value (weighted mean) | 4 | 9.25 | 2.25 | 3.5 | 1 | 20 |

In some embodiments, the performance value may be determined based on the integrity score total for the worst performing device among the one or more monitored devices analyzed at step 307. For example, referring to Table 19 below, Device 2 has the worst (e.g., highest) integrity score total among Devices 1-4. In this example, performing monitor 118 may determine that the performance value for Devices 1-4 is 14 (i.e., the integrity score total for Device 2).

TABLE 19

|  | US SNR Score | US RX Score | US TX Score | DS RX Score | DS SNR Score | Total Score |
|---|---|---|---|---|---|---|
| Device 1 | 0 | 7 | 0 | 3 | 0 | 10 |
| Device 2 | 0 | 8 | 0 | 4 | 2 | 14 |
| Device 3 | 4 | 0 | 1 | 0 | 0 | 5 |
| Device 4 | 4 | 7 | 2 | 0 | 0 | 13 |
| Performance Value (worst performing device) |  |  |  |  |  | 14 |

At step 314, the system may evaluate the performance value of the one or more analyzed devices, and compare it to a response scale to determine what steps (e.g., corrective measures), if any, should be taken. In some embodiments, one or more computing devices, such as performance monitoring device 118 may evaluate the performance value determined during step 313 and compare it to one or more response scales to determine whether corrective measures (e.g., updates, service repairs) may be required. The response scale may indicate the one or more service formats that may be initiated if the determined performance value reaches and/or exceeds a predefined value (e.g., a threshold performance value). In one embodiment, one or more computing devices, such as performance monitor 118, may store in memory information relating to a selected response scale and/or corresponding service formats. In another embodiment, one or more computing devices may associate, in a database, information relating to a selected response scale and/or corresponding service formats with device identifier information for the one or more monitored devices analyzed at step 307.

In some embodiments, the response scale and/or corresponding service formats may be selected based on the type of service session initiated at step 304. For example, the response scale and/or corresponding service formats relating to an in-premises service session may differ from the response scale and/or corresponding service formats relating to a service session that was initiated after a user contacts a service agent. As another example, the response scale and/or corresponding service formats relating to a user self-help website offered by the network provider may differ from the response scale and/or corresponding service formats relating to a service session initiated when a user begins communicating with a service agent via the network provider's website (e.g., online chat).

In other embodiments, the response scale and/or corresponding service formats may be selected based on the current service session. For example, although a service session may have been initiated when a user enters a self-help website offered by the network provider (e.g., at step 304), as will be discussed in more detail below, after one or more attempts at troubleshooting a particular device issue, the user may be directed to a network administrator for further assistance. In this example, the response scale and/or corresponding service formats relating to the user self-help website offered by the provider may differ from the response scale and/or corresponding service formats relating to the service session initiated after a user begins communication with an administrator (e.g., service agent).

Table 20 below illustrates an exemplary response scale indicating performance scale thresholds and corresponding service formats:

TABLE 20

| Performance Value | Service Format |
|---|---|
| 0 to <8 | End Service Session |
| <15 to 8 | Transmit alert message to administrator (e.g., service agent) or personnel, identifying one or more analyzed devices and providing proposed updates or service repairs; OR Transmit alert message to user, prompting user to join service session with administrator via the network provider's website. |
| 15+ | Transmit alert message to administrator, to schedule personnel (e.g., service technician) to user's premises; OR Transmit alert message to administrator or personnel, identifying one or more analyzed devices and providing proposed updates or service repairs. |

In one embodiment, one or more computing devices, such as performance monitoring device 118, may compare the performance value determined at step 313, with one or more performance threshold values associated with the response scale and/or corresponding service formats identified during step 314. In some embodiments, performance monitoring device 118 may identify one or more service formats that may be initiated if the performance value reaches and/or exceeds one or more performance threshold values in the response scale. In one embodiment, performance monitoring device 118 may transmit a message to an administrator (e.g., service agent), informing the administrator of the performance value for the one or more monitored devices analyzed at step 307.

In one embodiment, one or more computing device, such as performance monitoring device 118, may transmit a message to display device 112 informing the user of the performance value for the one or more monitored devices analyzed at step 307. In another embodiment, one or more computing device, such as performance monitoring device 118, may transmit a message to an administrator (e.g., service agent, technician, etc.), informing the administrator of the performance value for the one or more monitored devices analyzed at step 307. The message indicating the performance value for the one or more monitored devices may also include other information relating to the monitored devices, such as device identifier information, performance metrics and corresponding metric values, and integrity score totals.

In some embodiments, one or more computing device, such as performance monitoring device 118 may be configured to transmit, to a display device associated with an administrator (e.g., service agent, technician, etc. . . . ), data associated with the performance metrics obtained from the one or more monitored devices analyzed at step 307. Various types of data may be transmitted to an administrator's display device, including data contained in the message(s) transmitted to the administrator indicating the performance value for the one or more monitored devices analyzed at step 307. In another embodiment, one or more computing devices, such as performance monitoring device 118, may be configured to display, on a user display device, data associated with the performance metrics and determined performance value(s) for the one or more monitored devices analyzed at step 307. In other embodiments, one or more computing devices, such as performance monitoring device 118, may be configured to signal an alarm if the performance value exceeds a particular performance threshold value to warrant the alarm.

During step 314, if the performance value for the one or more monitored devices analyzed at step 307 exceeds a performance scale threshold value identified during step 314, the system may move on to step 315. At step 315, a service may be initiated in accordance with one or more service formats identified during step 314. The service initiated during step 315 may consist of performing one or more service repairs, updates, or other servicing measures taken in accordance with the plurality of available service formats identified during step 314. In some embodiments, one or more computing devices may store in memory information relating to the specific service repair(s) or update(s) initiated for a user premises device (e.g., initiated service information). In other embodiments, monitoring device 118 may store in memory information relating to the particular user premises device for which the service was initiated (i.e., corresponding device identifier information). In another embodiment, one or more computing devices, such as monitoring device 118 may associate, in a database, initiated service information with the corresponding device identifier information.

In some embodiments, one or more computing devices, such as performance monitor 118, may adjust a response scale and/or corresponding service formats based on previously collected performance data and initiated service information. Such performance data may include retrieved performance metric data and performance values previously obtained from a plurality of devices located at one or more premises of other users on the network. Monitoring device 118 may be configured to retrieve and performance data obtained from the plurality of devices over a predetermined time period (e.g., 1-month, 1 year, 5 years).

In one embodiment, one or more computing devices, such as monitoring device 118, may compare performance data for one or more monitored devices analyzed at step 307 with performance data previously obtained from a plurality of devices located at one or more premises of other users on the network. For example, monitoring device 118 may compare performance metrics for user premises device (e.g., STB 113) to performance metrics previously obtained from one or more set-top-boxes located at the premises of other users on the network.

As example, referring to Table 18, in the instance where the performance value for the one or more monitored devices (e.g., Devices 1-4) is determined to be 20, monitoring device 118 may retrieve from memory performance metric data and performance quality data (e.g., good, fair, poor metric ranges) associated with one or more previously monitored devices having a performance value of 20. In this example, monitoring device 118 may retrieve from memory performance metric data and performance quality data for monitored devices having a performance value of 20, wherein the previously monitored devices (e.g., gateway, STB, modem, etc.) correspond to Devices 1-4. For instance, if Devices 1-4 consist of two modems and two gateways, monitoring device 118 may retrieve from memory performance metric data and performance quality data associated with previously monitored devices that consist of two modems and two gateways and have a performance value of 20. In another example, monitoring device 118 may retrieve from memory performance metric data and performance quality data for previously monitored devices having a performance value of 20, wherein the device types of the previously monitored devices (e.g., a Motorola STB, a Cisco STB and a DOCSIS STB) correspond to the device types for Devices 1-4. For instance, if the device types for Devices 1-4 consist of two Motorola STBs and two Cisco modems, monitoring device 118 may retrieve from memory performance metric data and performance quality data associated with previously monitored devices comprising two Motorola STBs and two Cisco modems and having a performance value of 20.

In another embodiment, one or more computing devices, such as monitoring device 118, may be configured to compare the one or more available service formats identified during step 314 with service format information and corresponding initiated service information relating to one or more previously monitored user premises devices. For example, monitoring device 118 may be configured to compare the one or more available service formats identified during step 314 with the service formats and corresponding initiated service information relating to one or more previously monitored user premises devices having similar performance metrics and/or performance values as the one or more devices analyzed at step 307. Monitoring device 118 may be further configured to compare the one or more available response scales and/or corresponding service formats during step 314 with the response scales and/or service formats associated with one or more previously monitored user premises devices having similar performance metrics and/or performance values. Monitoring device 118 may be configured to adjust one or more response scales and/or corresponding service formats available for selection during step 314 based on the one or more service repairs or updates previously initiated on similarly situated user devices (e.g., user premises devices having similar performance metrics and/or performance values).

For example, referring to Tables 18 and 19, in the instance of a user contacting a service agent and the performance value for the one or more monitored devices (e.g., Devices 1-4) is 20, monitoring device 118 may retrieve from memory service history information associated with one or more previously monitored devices having a performance value of 20. The service history information may include a history of previous service repairs, updates, other performed services, selected response scales, and corresponding service formats and performance value thresholds for a plurality of previously monitored devices located at one or more premises of other users on the network. In this example, monitoring device 118 may retrieve from memory service history information for monitored devices having a performance value of 20, wherein the previously monitored device corresponds to Devices 1-4. Also, in this example, monitoring device 118 may retrieve from memory service history information for monitored devices having a performance value of 20, wherein the previously monitored device types correspond to the device types of Devices 1-4.

In some embodiments, monitoring device 118 may retrieve from memory service history information associated with one or more previously monitored devices having performance values within a predetermined range of the performance value for the one or more monitored devices analyzed at step 307. For example, in the event the performance value for one or more monitored devices is determined to be 16, monitoring device 118 may retrieve from memory service history information associated with one or more previously monitored devices having performance values within two points of 16 (e.g., performance values ranging from 14 to 18). In other embodiments, monitoring device 118 may retrieve from memory performance metric data and performance quality data associated with one or more previously monitored devices having a performance values within a predetermined range of the performance value for one or more monitored devices analyzed at step 307.

In some embodiments, after retrieving the service history information associated with similarly situated user devices, monitoring device 118 may adjust a response scale and/or corresponding service formats identified during step 314 in accordance with the retrieved service information. For example, referring to Table 20, after retrieving and processing service history information, if monitoring device 118 determines that one or more previously monitored devices having a performance value of 7 subsequently required a service repair or update, monitoring device 118 may be configured to adjust the response scale and corresponding service formats such that the service session should ended when the performance value of the monitored device(s) falls within the range of 0 to less than 7. As another example, if monitoring device 118 determines that one or more previously monitored devices having a performance value of 13 subsequently required an in-premises technician to be scheduled, monitoring device 118 may be configured to adjust the response scale and/or corresponding service formats such that an in-premises technician should be scheduled when the performance value of the one or more monitored devices is greater than 13.

In some embodiments, monitoring device 118 may adjust one or more service formats identified during step 314 in accordance with retrieved service history information and performance data. For example, if monitoring device 118 determines that one or more previously monitored devices having a performance value of 10 and poor US SNR quality subsequently required an in-premises technician to be scheduled, monitoring device 118 may be configured to adjust one or more service formats made available during step 314 to include scheduling an in-premises technician. In other embodiments, monitoring device 118 may be configured to identify one or more service repairs or updates to initiate based on the retrieved service history information and performance metric data. For example, monitoring device 118 may be configured to transmit to one or more administrators (e.g., service agents) a message indicating that the one or more identified service repairs or updates should be initiated. In some embodiments, the message indicating various service repairs or updates to be initiated may be displayed on a display device associated with the one or more administrators.

After the one or more services initiated during step 315 have been performed, the system may return to step 305. The system may continue to perform steps 305 through 314 until the performance value of the monitored devices no longer exceeds one or more performance threshold values (e.g., further service repairs, updates, or other servicing measures are no longer warranted). For example, referring to Table 17, in the instance where a service session was operated by an in-premises technician and the performance value for Devices 1-4 is 14, a service repair or update may be initiated in accordance with an appropriate service format identified in Table 20. In this example, the in-premises service technician may continue to perform one or more service repairs or updates and obtain updated performance values until the performance value for Devices 1-4 falls below 8.

As another example, in the instance where a service session begins by a user contacting a service agent and the performance value for the one or more user premises devices is 18, a service repair or update may be initiated in accordance with an appropriate service format identified in Table 20. In this example, the service agent may schedule a service technician to the user's premises, at which point the service technician may continue the service session (or begin a new service session), and perform one or more service repairs or updates and obtain updated performance values until the performance value for the user's monitored premises device(s) falls below 8. In yet another example, in the instance where a service session begins by a user contacting a service agent and the performance value for the user's premises devices is 11, a service repair or update may be initiated in accordance with an appropriate service format identified in Table 20. In this example, the service agent may provide the user with instructions for servicing the user's monitored premises devices. Thereafter, the service agent will continue to provide the user with service instructions and obtain updated performance values until the performance value for the user's monitored premise devices falls below 8. As will be appreciated, after an initial service repair or update has been performed, when obtaining additional performance metrics, the service agent (or other administrative agent) may broaden or limit the number devices to be monitored for performing the subsequent service repairs or updates. In some embodiments, one or more computing devices, such as performance monitoring device 118, may perform steps 314 and 315 concurrently.

Returning to step 314, if the performance value for the one or more monitored devices being analyzed does not exceed a performance scale threshold value, the system may proceed to step 316. At step, 316 the service session initiated at step 304 may be terminated. For example, referring to Table 20 above, if the performance value for Devices 1-4 is 2, the service agent identified at step 304 may end the service session. Alternatively, any other service agent, service technician, or other personnel associated with the network provider may end the service session in the event that the performance value does not exceed the performance scale threshold value. In other embodiments, one or more computer devices may transmit a message to the user indicating that the service session has ended.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:
1. A method comprising:
   identifying one or more computing devices to monitor;
   determining at a processor, a plurality of threshold metric ranges for a plurality of performance metrics;
   measuring device performance for the one or more computing devices, resulting in a plurality of measured performance metric values;

for each performance metric:
  comparing the measured performance metric value to one or more corresponding threshold metric ranges; and
  assigning metric integrity scores to the one or more computing devices based on the comparison;
determining at the processor, an aggregate performance value for the one or more computing devices based at least in part on the assigned metric integrity scores; and
identifying a service format for the one or more computing devices based on the aggregate performance value and a type of service session.

2. The method of claim 1, wherein determining the aggregate performance value for the one or more computing devices further comprises:
  determining combined metric integrity scores for each computing device in the one or more computing devices based at least in part on the assigned metric integrity scores.

3. The method of claim 1, wherein identifying a service format for the one or more computing devices further comprises:
  determining the service format for the one or more computing devices based on a comparison of the aggregate performance value to one or more performance thresholds of a first response scale.

4. The method of claim 1, further comprising determining metric integrity scores for each threshold metric range in the plurality of threshold metric ranges.

5. The method of claim 1, further comprising determining, at a computing device, whether to continue a service session based, at least in part, on the aggregate performance value for the one or more computing devices.

6. The method of claim 1, wherein identifying the service format for the one or more computing devices, further comprises:
  adjusting one or more response scales in accordance with service history information for a plurality of monitored devices in a network.

7. The method of claim 1, further comprising:
  determining a combined integrity score for each computing device in the one or more computing devices based on assigned metric integrity scores.

8. The method of claim 7, wherein determining the plurality of threshold metric ranges further comprises:
  identifying at least a first metric range and a second metric range, wherein the first and second metric ranges correspond to a level of device performance.

9. The method of claim 8, further comprising using the first and second metric ranges to determine the combined integrity score for each computing device in the one or more computing devices.

10. The method of claim 8, further comprising:
  identifying, for one or more performance metrics in the plurality of performance metrics, a third metric range; and
  using the first, second, and third metric ranges to determine the combined integrity score for each computing device in the one or more computing devices.

11. The method of claim 7, wherein the aggregate performance value for the one or more computing devices is further determined in accordance with the combined integrity score for a worst performing computing device in the one or more computing devices.

12. The method of claim 1, wherein a first performance metric in the plurality of performance metrics is an upstream or downstream data carrier reception level.

13. The method of claim 1, wherein a first performance metric in the plurality of performance metrics is an upstream or downstream signal-to-noise ratio level.

14. The method of claim 1, further comprising:
  utilizing the aggregate performance value to generate a message indicating performance of the one or more computing devices.

15. A performance monitoring apparatus comprising:
  a processor; and
  memory operatively coupled to the processor and storing computer readable instructions that, when executed, cause the apparatus to:
    identify one or more computing devices to monitor;
    determine a plurality of threshold metric ranges for a plurality of performance metrics;
    measure device performance for the one or more computing devices resulting in a plurality of measured performance metric values;
    for each measured performance metric:
      comparing the measured performance metric value to one or ore corresponding threshold metric ranges; and
      assigning metric integrity scores to the one or more computing devices base on the comparison;
    determine an aggregate performance value for the one or more computing devices based at least in part on the assigned metric integrity scores; and
    identify a service format for the one or more computing devices based on the aggregate performance value and a type of service session.

16. The performance monitoring apparatus of claim 15, wherein the computer readable instructions, when executed, further cause the apparatus to:
  transmit, to a display device, a message indicating the aggregate performance value for the one or more computing devices.

17. The performance monitoring apparatus of claim 15, wherein the computer readable instructions, when executed, further cause the apparatus to:
  adjust one or more response scales in accordance with service history information for a plurality of computing devices on a network.

18. The performance monitoring apparatus of claim 15, wherein the computer readable instructions, when executed, further cause the apparatus to:
  determine whether to continue a service session based, at least in part, on the aggregate performance value for the one or more computing devices.

19. The performance monitoring apparatus of claim 15, wherein the computer readable instructions, when executed, further cause the apparatus to:
  determine a combined integrity score for each computing device in the one or more computing devices based on assigned metric integrity scores.

20. The performance monitoring apparatus of claim 19, wherein the aggregate performance value for the one or more computing devices is further determined in accordance with the combined integrity score for a worst performing computing device in the one or more computing devices.

* * * * *

UNITED STATES PATENT AND TRADEMARK OFFICE
CERTIFICATE OF CORRECTION

PATENT NO. : 9,438,500 B2
APPLICATION NO. : 14/220667
DATED : September 6, 2016
INVENTOR(S) : Wilfredo Colon et al.

Page 1 of 1

It is certified that error appears in the above-identified patent and that said Letters Patent is hereby corrected as shown below:

In the Specification

Column 18, Detailed Description, Line 23:
Please delete "dBMV" and insert --dBmV--

Column 18, Detailed Description, Line 27:
Delete "dBMV," and insert --dBmV,--

Column 23, Detailed Description, Line 61:
Delete "1-4 ." and insert --1-4.--

Column 24, Detailed Description, Line 6:
Delete "1-4 ." and insert --1-4.--

Column 24, Detailed Description, Line 53:
Delete "1-4 ." and insert --1-4.--

In the Claims

Column 27, Claim 1, Line 7:
Delete "determining" and insert --determining,--

Column 28, Claim 15, Line 20:
Delete "devices" and insert --devices,--

Column 28, Claim 15, Line 24:
Delete "ore" and insert --more--

Column 28, Claim 15, Line 27:
Delete "base" and insert --based--

Signed and Sealed this
Twenty-sixth Day of February, 2019

Andrei Iancu
*Director of the United States Patent and Trademark Office*